Dec. 7, 1937.        J. H. KNOBECK        2,101,781
FREEWHEELING DEVICE FOR AEROPLANE PROPELLERS
Filed Dec. 22, 1936
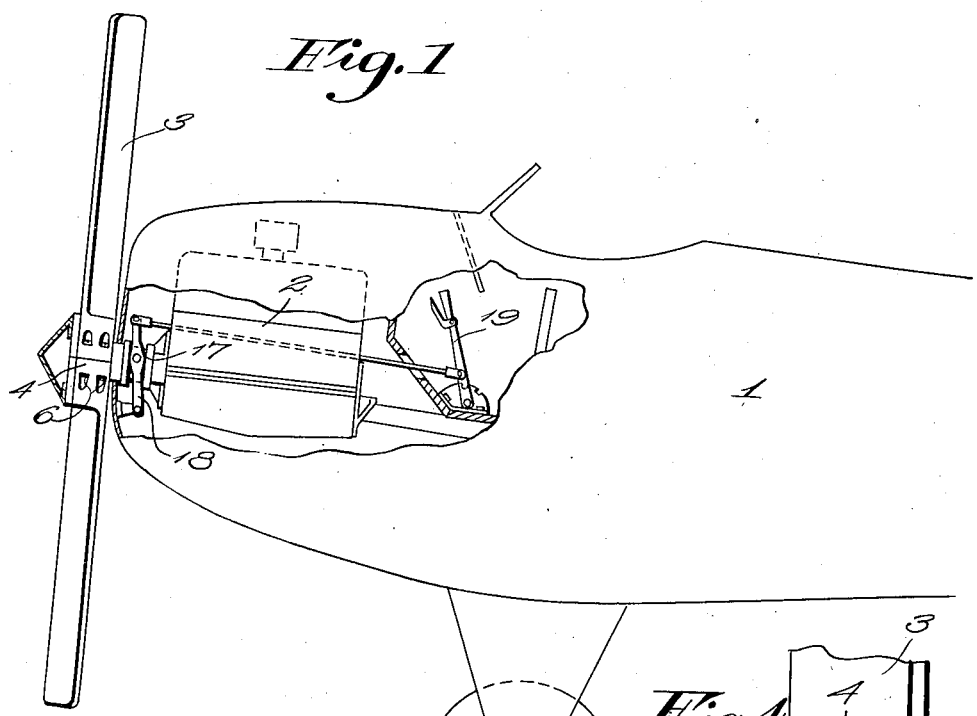
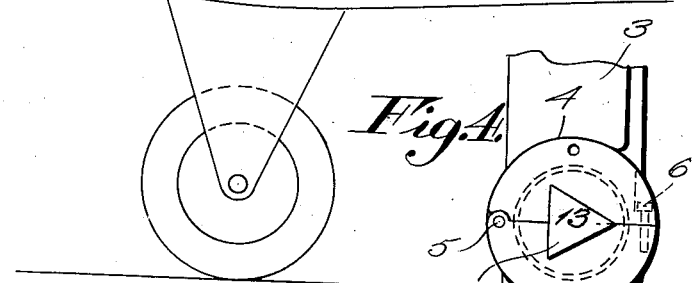
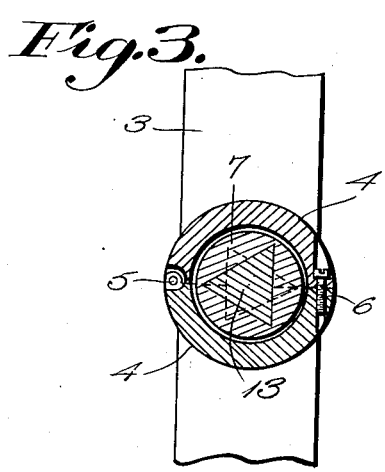
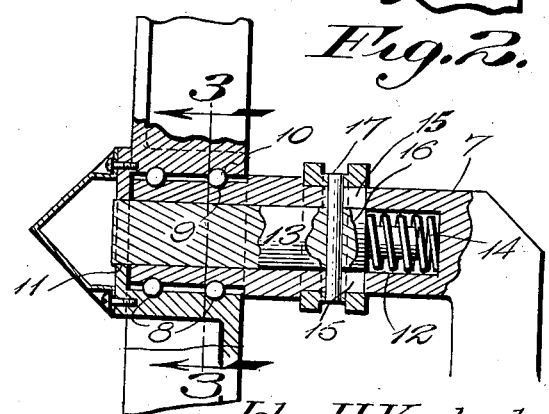
John H. Knobeck
INVENTOR
BY Victor J. Evans & Co.
ATTORNEYS Patented Dec. 7, 1937

2,101,781

UNITED STATES PATENT OFFICE 2,101,781

FREEWHEELING DEVICE FOR AEROPLANE PROPELLERS

John H. Knobeck, Madison, Wis.

Application December 22, 1936, Serial No. 117,244

1 Claim. (Cl. 170—173)

This invention relates to a free wheeling device for aeroplane propellers and has for the primary object the provision of a device of this character which will provide between the propeller and the engine of the aeroplane a clutch which may be easily and quickly actuated by the pilot of the aeroplane to either drive the propeller by the engine or to disconnect the propeller from the engine so that it may remain idle when the aeroplane is standing still on the ground or to permit the propeller to rotate freely of the engine under the influence of the air currents when landing or when desiring to decrease the speed of the aeroplane while in flight.

With these and other objects in view, this invention consists in certain novel features of construction, combination and arrangement of parts to be hereinafter more fully described and claimed.

For a complete understanding of my invention, reference is to be had to the following description and accompanying drawing, in which—

Figure 1 is a fragmentary side elevation, partly in section, illustrating an aeroplane having the propeller thereof connected to the engine by a device constructed in accordance with the present invention.

Figure 2 is a fragmentary vertical sectional view showing a clutch forming the subject matter of the present invention for connecting and disconnecting the propeller to the engine.

Figure 3 is a transverse sectional view taken on the line 3—3 of Figure 2.

Figure 4 is a fragmentary front elevation illustrating the hub of the propeller with the dust cap removed.

Referring in detail to the drawing, the numeral 1 indicates a fragmentary portion of an aeroplane, 2 the engine thereof and 3 the propeller. In this instance, the propeller or the hub 4 thereof is constructed of companion sections hingedly connected, as shown at 5, and detachably connected by stud bolts, as shown at 6. The hub of the propeller being constructed in this manner permits the sections of the hub to be moved apart for the purpose of adapting the propeller to the crank shaft 7 of the engine 2. The bore of the hub has annular grooves 8 cooperating with annular grooves 9 formed on the crank shaft and providing raceways for anti-friction balls 10. Thus it will be seen that the propeller may rotate on the crank shaft with a minimum amount of friction. A portion of the bore of the hub is of triangular shape, as shown at 11. Slidably mounted in a chamber 12 formed in the crank shaft 7 is a clutch element 13. The chamber 12 is substantially triangular shaped in cross section and also the clutch element 13. A coil spring 14 acts on the clutch element to urge the latter into the triangular-shaped portion 11 of the bore of the hub and thereby establishes a driving connection between the crank shaft and the propeller. The crank shaft has slots 15 through which extends a pin 16. The pin is secured to the clutch element and also to a clutch sleeve 17 slidably mounted on the crank shaft. A clutch lever 18 of the pivotally mounted type is connected to the clutch sleeve 17 and to a control lever 19 mounted in the fuselage 1 adjacent the pilot's seat. The construction or connection between the clutch lever 18 and the sleeve 17 is such that the sleeve is free to rotate but pivotal movement of the clutch lever will impart sliding movement to the clutch sleeve for the purpose of retracting the clutch element from the triangular shaped bore of the hub so that the propeller may rotate free of the crank shaft and thereby provide free wheeling to the propeller.

Having described the invention, I claim:

In combination with an aeroplane engine having a power shaft provided with a bore of triangular shape in cross section, a propeller including a hub journaled on said shaft and provided with a triangular-shaped bore, a spring-pressed clutch element slidable in the bore of the shaft and adapted to enter the triangular-shaped bore of the hub for securing the propeller to the shaft, and a manual control connected to the clutch element.

JOHN H. KNOBECK.